US 8,169,428 B2

(12) United States Patent
Cho et al.

(10) Patent No.: US 8,169,428 B2
(45) Date of Patent: May 1, 2012

(54) DISPLAY SUBSTRATE, METHOD OF MANUFACTURING THE SAME AND DISPLAY DEVICE HAVING THE SAME

(75) Inventors: Sung-Hwan Cho, Hwaseong-si (KR); Ho-Nam Yum, Seoul (KR); Dae-Ho Choo, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1094 days.

(21) Appl. No.: 11/474,112

(22) Filed: Jun. 23, 2006

(65) Prior Publication Data

US 2007/0081106 A1    Apr. 12, 2007

(30) Foreign Application Priority Data

Jun. 23, 2005  (KR) .................. 10-2005-0054302

(51) Int. Cl.
  *G09G 5/00*   (2006.01)
  *G02F 1/1335* (2006.01)
  *G02F 1/1333* (2006.01)

(52) U.S. Cl. ............ 345/205; 349/113; 349/56; 345/55; 345/204

(58) Field of Classification Search ............ 349/56, 349/113; 359/237, 245, 265–274, 290–295, 359/315; 345/55, 204–206
See application file for complete search history.

(56) References Cited

U.S. PATENT DOCUMENTS

| | | | | |
|---|---|---|---|---|
| 3,128,540 A * | 4/1964 | Gwyn, Jr et al. | ................ | 75/240 |
| 5,619,356 A * | 4/1997 | Kozo et al. | ................ | 349/99 |
| 6,081,310 A * | 6/2000 | Katsuya et al. | ................ | 349/113 |
| 6,111,684 A * | 8/2000 | Forgette et al. | ................ | 359/267 |
| 2002/0176029 A1* | 11/2002 | Fujino | ................ | 349/43 |
| 2003/0147029 A1* | 8/2003 | Liu | ................ | 349/113 |
| 2003/0213956 A1* | 11/2003 | Hioki et al. | ................ | 257/59 |
| 2003/0227250 A1* | 12/2003 | Nee | ................ | 313/495 |
| 2004/0051826 A1 | 3/2004 | Lee | | |
| 2004/0114071 A1* | 6/2004 | Rho | ................ | 349/106 |
| 2005/0083461 A1* | 4/2005 | Yang et al. | ................ | 349/114 |

FOREIGN PATENT DOCUMENTS

| | | |
|---|---|---|
| JP | 2002-226927 | 8/2002 |
| JP | 2003-043522 | 2/2003 |
| JP | 2004-199050 | 7/2004 |
| JP | 2005-128171 | 5/2005 |
| JP | 2005-141250 | 6/2005 |

* cited by examiner

*Primary Examiner* — Lun-Yi Lao
*Assistant Examiner* — Jarurat Suteerawongsa
(74) *Attorney, Agent, or Firm* — F. Chau & Associates, LLC

(57) ABSTRACT

A display device includes silver-molybdenum alloy electrodes having high reflectivity despite annealing temperatures. The display may have a first display substrate, a second display substrate and a liquid crystal layer. The first display substrate includes signal-applying modules (e.g., TFTs) disposed on a first substrate each including an output terminal configured to output a data signal, a patterned insulation layer having contact holes that expose the output terminals, and silver-molybdenum alloy electrodes (made of silver and molybdenum) electrically connected to the output terminals. The silver-molybdenum alloy electrode is employed in the display device, thereby increasing reflectivity of the display device and improving display quality of an image displayed by the display device.

13 Claims, 15 Drawing Sheets

5 sec 8 sec 11 sec 17 sec

DISPLAY SUBSTRATE, METHOD OF MANUFACTURING THE SAME AND DISPLAY DEVICE HAVING THE SAME

CROSS-REFERENCE TO RELATED APPLICATIONS

This application relies for priority under 35 U.S.C. §119 of Korean Patent Application No. 2005-54302 filed on Jun. 23, 2005, the entire contents of which are herein incorporated by reference.

BACKGROUND OF THE INVENTION

1. Field of the Invention

The present invention relates to a display substrate, a method of manufacturing the display substrate and a display device having the display substrate. More particularly, the present invention relates to a display substrate capable of improving display quality of an image, a method of manufacturing the display substrate and a display device having the display substrate.

2. Description of the Related Art

Generally, a display device converts information processed from an information processing device to an image.

Examples of the display devices include a cathode ray tube (CRT) type display device, a liquid crystal display (LCD) device, an organic light emitting display (OLED) device, etc.

Liquid crystal display (LCD) devices are classified into three types, a transmissive type LCD device, a reflective type LCD device, and a reflective-transmissive type LCD device, depending upon the method of using light.

The transmissive type LCD device displays an image using light provided from an internal lamp installed within the LCD device. The reflective type LCD device displays an image using light externally provided (e.g., from the sun, a lamp, or other illuminating device). The reflective-transmissive type LCD device displays an image using light internally provided from a lamp installed in the LCD device and/or externally provided.

The transmissive type LCD device includes a transparent electrode that is transparent and conductive, while the reflective type LCD device includes a reflective electrode that has a greater reflectivity than a transparent electrode. The reflective-transmissive type LCD device includes both a transparent electrode and a reflective electrode.

When the reflective electrode of the reflective type LCD device or the reflective-transmissive type LCD device includes aluminum or aluminum alloy having a high reflectivity (e.g., reflective electrodes made of aluminum or of aluminum alloy), hillocks may be formed on the surface of the reflective electrode (e.g., during a curing process for an alignment layer formed on the reflective electrode), and galvanic corrosion may occur between the reflective electrode and the transparent electrode.

Aluminum films are remarkably good for fabricating electrodes and lines because of their low resistivity, low cost, high adhesion, and superior patternability. However, the thermal expansion mismatch between Al films and a substrate or layer of display panels produces a large compressive stress in the Al films upon heating, and results in the formation of hillocks (or whiskers) in order to relieve the stress.

In order to prevent the galvanic corrosion problem, a corrosion-proof layer may be formed between the reflective electrode and the transparent electrode. However, formation of the corrosion-proof layer requires a great increase in the number of manufacturing steps in a manufacturing process, which increases manufacturing costs.

SUMMARY OF THE INVENTION

An aspect of present invention provides a display substrate having a silver-molybdenum alloy electrode and capable of improved image display quality.

An aspect of the present invention provides a method of manufacturing the display substrate.

Another aspect of the present invention provides a display device having the display substrate.

In one aspect of the present invention, a display substrate includes a silver-molybdenum alloy electrode (e.g., per each pixel). The display substrate may include a signal-applying module (e.g., a thin-film transistor, TFT), a patterned insulation layer and a silver-molybdenum alloy electrode. The signal-applying module is disposed on a substrate and includes an output terminal (e.g., a TFT transistor-drain terminal) configured to output a data signal. The patterned insulation layer has a contact hole that exposes the output terminal. The silver-molybdenum alloy electrode is electrically connected to the output terminal and has silver and molybdenum.

In another aspect of the present invention, in order to manufacture a display substrate, a signal-applying module including an output terminal configured to output a data signal is formed on a substrate (e.g., for each pixel); a contact hole that exposes a portion of the output terminal is formed through an insulation layer covering the signal-applying module to form a patterned insulation layer; and a silver-molybdenum alloy layer electrically connected to the output terminal is formed on the patterned insulation layer. The silver-molybdenum alloy layer is patterned to form a silver-molybdenum alloy electrode (e.g., at each pixel of the display).

In still another aspect of the present invention, a display device includes a first display substrate (including a silver-molybdenum alloy electrode), and may further include a second display substrate and a liquid crystal layer. The first display substrate includes a signal-applying module (e.g., a TFT transistor) for each pixel on the first substrate (the signal-applying module including an output terminal configured to output a data signal), a patterned insulation layer having a contact hole that exposes the output terminal, and a silver-molybdenum alloy electrode (made of silver and molybdenum) electrically connected to the output terminal. The second display substrate includes a common electrode that is disposed on a second substrate facing the first substrate. The common electrode faces the silver-molybdenum alloy electrode. The liquid crystal layer is disposed between the first and second display substrates.

The present invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like reference numerals refer to similar or identical elements throughout. It will be understood that when an element such as a layer, region or substrate is referred to as being "on", "upon" or "onto" another element, it may be directly on the other element or intervening elements may also be present.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF EXEMPLARY EMBODIMENTS OF THE INVENTION

Display Substrate

Figure 1:
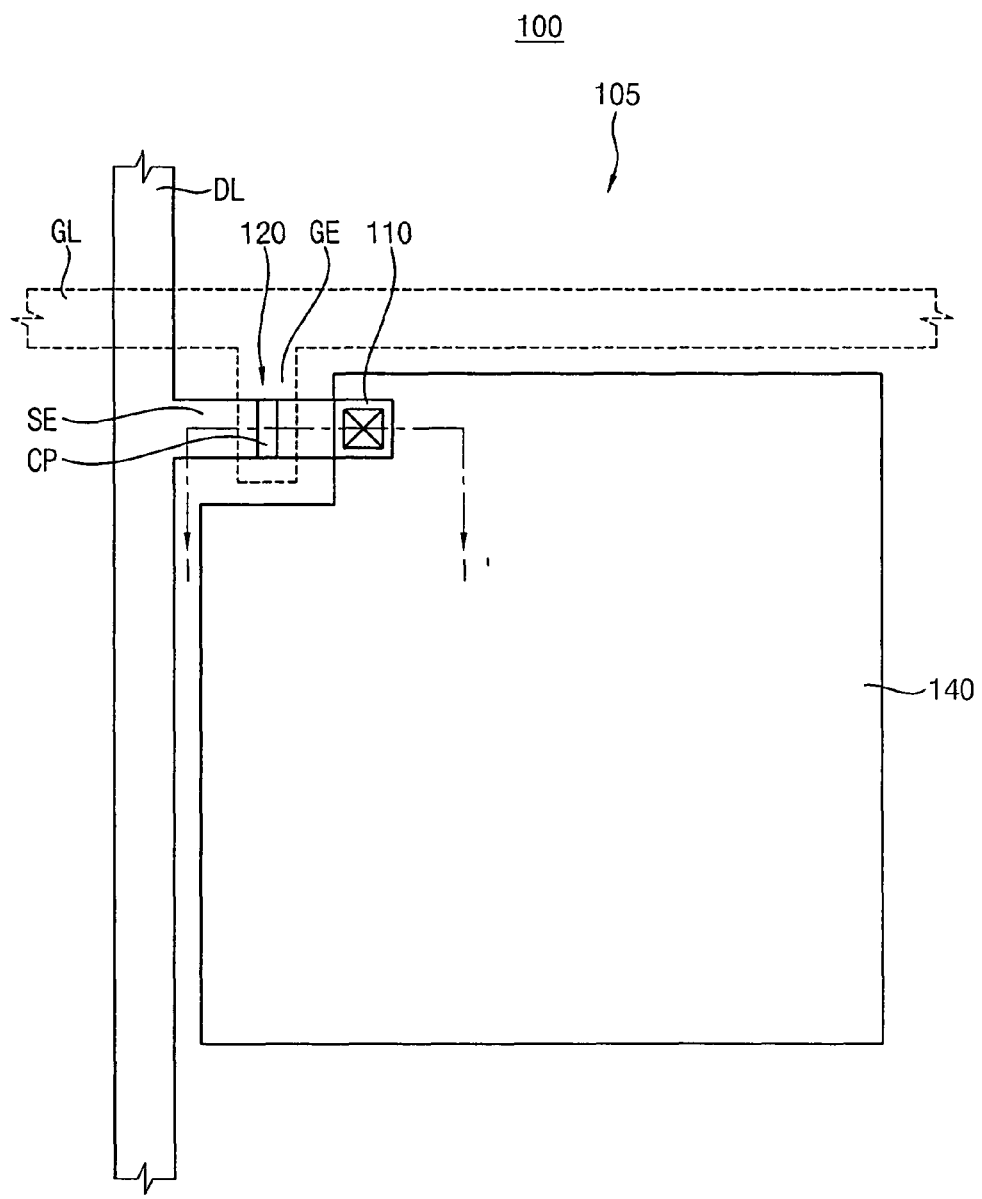
FIG. 1 is a plan view of one pixel region of a display substrate according to an exemplary embodiment of the present invention.
Figure 2:
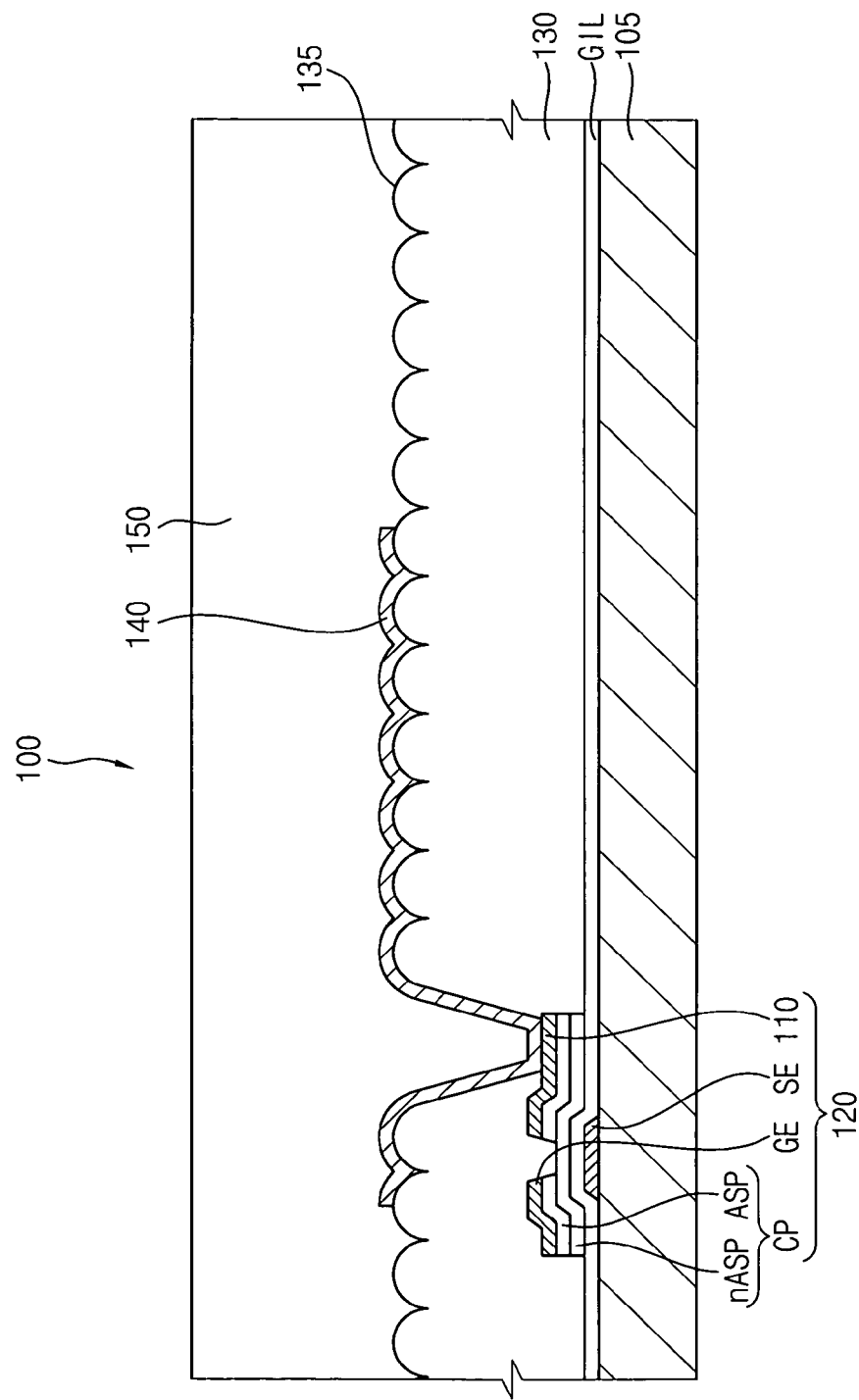
FIG. 2 is a cross-sectional view taken along section line I-I' in FIG. 1.

FIG. 1 is a plan view of a display substrate according to an exemplary embodiment of the present invention. FIG. 2 is a cross-sectional view taken along section line I-I' in FIG. 1.

Referring to FIGS. 1 and 2, a display substrate 100 includes a substrate 105, a signal-applying module 120 having an output terminal 110, a patterned insulation layer 130 and a silver-molybdenum alloy electrode 140.

The substrate 105 may be formed of a transparent substrate material such as a glass or other substrate material capable of passing light.

The signal-applying module 120 is disposed on the substrate 105. The signal-applying module 120 outputs image data that is externally provided.

As more particularly illustrated in FIG. 2, the signal-applying module 120 includes a gate line GL having a gate electrode GE, a gate insulation layer GIL, a channel pattern CP, a data line DL having a source electrode SE and the output terminal 110.

When the three-color display including display substrate 100 has a pixel resolution of 1024×768: a plurality (768) of gate lines GL extend substantially parallel to each other in a first (horizontal) direction that is substantially perpendicular to a second (vertical) direction; a plurality (1024×3) of data lines DL (each data line including 768 source electrodes SE) extend substantially parallel to each other in the second (vertical) direction; and, a plurality (1024×3) of gate electrodes GE protrudes from each of the (768) gate lines GL on the substrate 105, protruding in a direction that is substantially parallel with the second direction.

The gate insulation layer GIL covers the gate lines GL and the gate electrodes GE so as to insulate the gate lines GL from the data lines DL (including the source electrodes SE). The gate insulation layer GIL may include a transparent silicon nitride layer.

The channel pattern CP is formed as a semiconductor island upon the gate insulation layer GIL. The channel pattern CP, for example, is disposed on the gate insulation layer GIL in an area corresponding to the gate electrode GE. The channel pattern (semiconductor island) CP includes an amorphous silicon pattern ASP and an n+amorphous silicon pattern nASP. A pair of n+amorphous silicon patterns nASP are disposed on the amorphous silicon pattern ASP, and spaced apart from each other. The channel pattern CP and the electrodes (gate electrode, source electrode, and output (drain) electrode) form a transistor (data switch), such as a thin-film-transistor (TFT).

The data lines DL are disposed on the gate insulation layer GIL. The data lines DL extend in the second (vertical) direction that is substantially perpendicular to the first (horizontal) direction. When the three-color including display substrate 100 has a resolution of 1024×768, a plurality of 1024×3 data lines DL having are substantially parallelly arranged in the first direction. A plurality of 768 source electrodes SE protrude from each data line DL in a direction that is substantially parallel with the first (horizontal) direction. Each source electrode SE is electrically connected to one of the n+amorphous silicon patterns nASP in the semiconductor island (channel pattern CP).

The output terminal 110 is electrically connected to the other of the n+amorphous silicon patterns nASP. The output terminal 110 is formed simultaneously with the data line DL.

The patterned insulation layer 130 is disposed on the substrate 105, so that the signal-applying module 120 is covered by the patterned insulation layer 130. The patterned insulation layer 130 includes, for example, a photosensitive material that is sensitized to light so as to form the contact hole. The patterned insulation layer 130 is patterned such that a contact hole exposing the output terminal 110 of the signal-applying module 120.

A plurality of textured patterns 135 is formed on the patterned insulation layer 130. The textured patterns 135 increase a reflective area of a silver-molybdenum alloy electrode 140 that will be described later, and diffuses light reflected from the silver-molybdenum alloy electrode 140. The textured patterns 135 may be formed by embossing (and thus be embossed patterns) or by other methods (e.g., scribing, or etching)

The silver-molybdenum alloy electrode 140 is formed (e.g., conformally) on the textured patterns 135 on the patterned insulation layer 130. A portion of the silver-molybdenum alloy electrode 140 is electrically connected (through the contact hole) to the output terminal 110 exposed by the contact hole.

The silver-molybdenum alloy electrode 140 may preferably be composed of about 99 percent by weight to about 95 percent by weight of silver (Ag) and about 1 percent by weight to about 5 percent by weight of molybdenum (Mo).

An alignment layer 150 is formed on the silver-molybdenum alloy electrode 140. The alignment layer 150 includes, for example, polyimide resin. Alignment grooves are formed on the alignment layer 150 to align liquid crystal molecules.

The alignment layer 150 including polyimide resin is cured at a temperature of about 150° C. to about 250° C.

Hillocks may not be formed on the surface of the silver-molybdenum alloy electrode 140 when the alignment layer 150 is cured with a temperature of about 150° C. to about 250° C., thereby avoiding exfoliation of the silver-molybdenum alloy electrode 140 from the patterned insulation layer 130.

Figure 3:
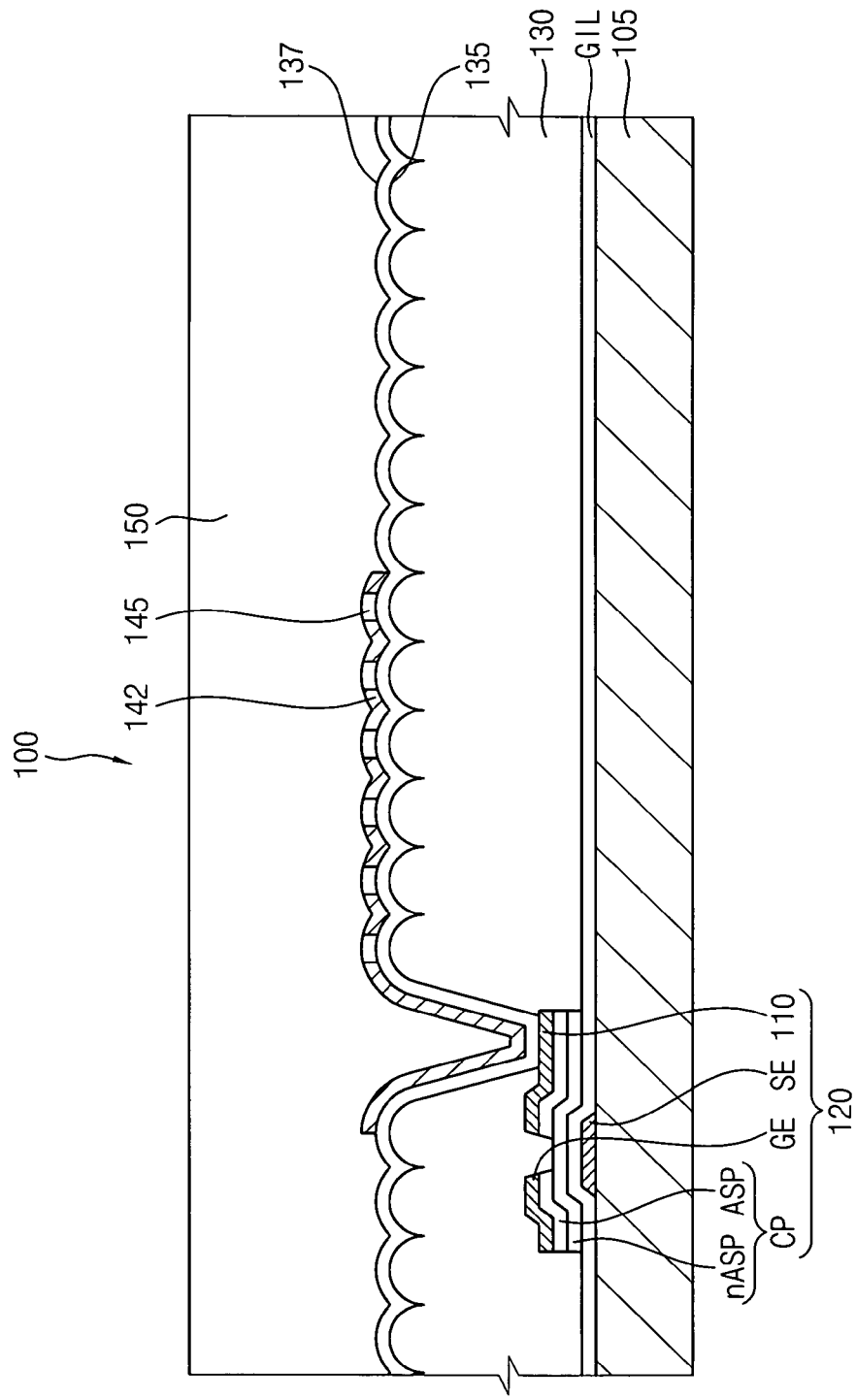
FIG. 3 is a cross-sectional view of a pixel region of a display substrate according to another exemplary embodiment of the present invention.

FIG. 3 is a cross-sectional view of a pixel region of a display substrate according to another exemplary embodiment of the present invention. The display substrate in FIG. 3 is substantially the same as the display substrate illustrated in FIGS. 1 and 2 except for a transparent electrode 137 and opening(s) 145 in the silver-molybdenum alloy electrode 142. Thus, any further descriptions for substantially the same elements will be omitted.

Referring to FIG. 3, a transparent electrode 137 that is transparent and conductive is formed on the patterned insulation layer 130. The transparent electrode 137 includes, for example, indium tin oxide (ITO), indium zinc oxide (IZO), amorphous indium tin oxide (a-ITO), etc. A portion of the transparent electrode 137 is electrically connected to the output terminal 110 that is exposed by a contact hole formed through the patterned insulation layer 130.

A silver-molybdenum alloy electrode 142 is disposed on the transparent electrode 137. The silver-molybdenum alloy electrode 142 may preferably have about 99 percent by weight to about 95 percent by weight of silver (Ag) and about 1 percent by weight to about 5 percent of by weight of molybdenum (Mo).

A plurality of openings 145 may be formed through the silver-molybdenum alloy electrode 142 down to the transparent electrode 137. Light may effectively pass through the openings 145, and through the transparent electrode 137. The openings 145, for example, may have a polygon perimeter shape when viewed from a plan view.

Method of Manufacturing a Display Substrate

Figure 4:
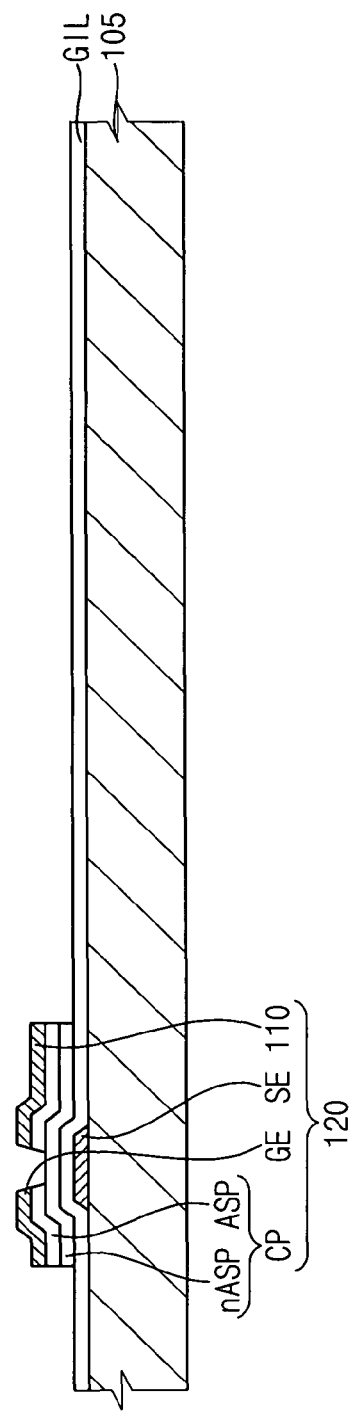
FIG. 4 is a cross-sectional view of a display substrate for illustrating a method of manufacturing according to an exemplary embodiment of the present invention.
Figure 5:
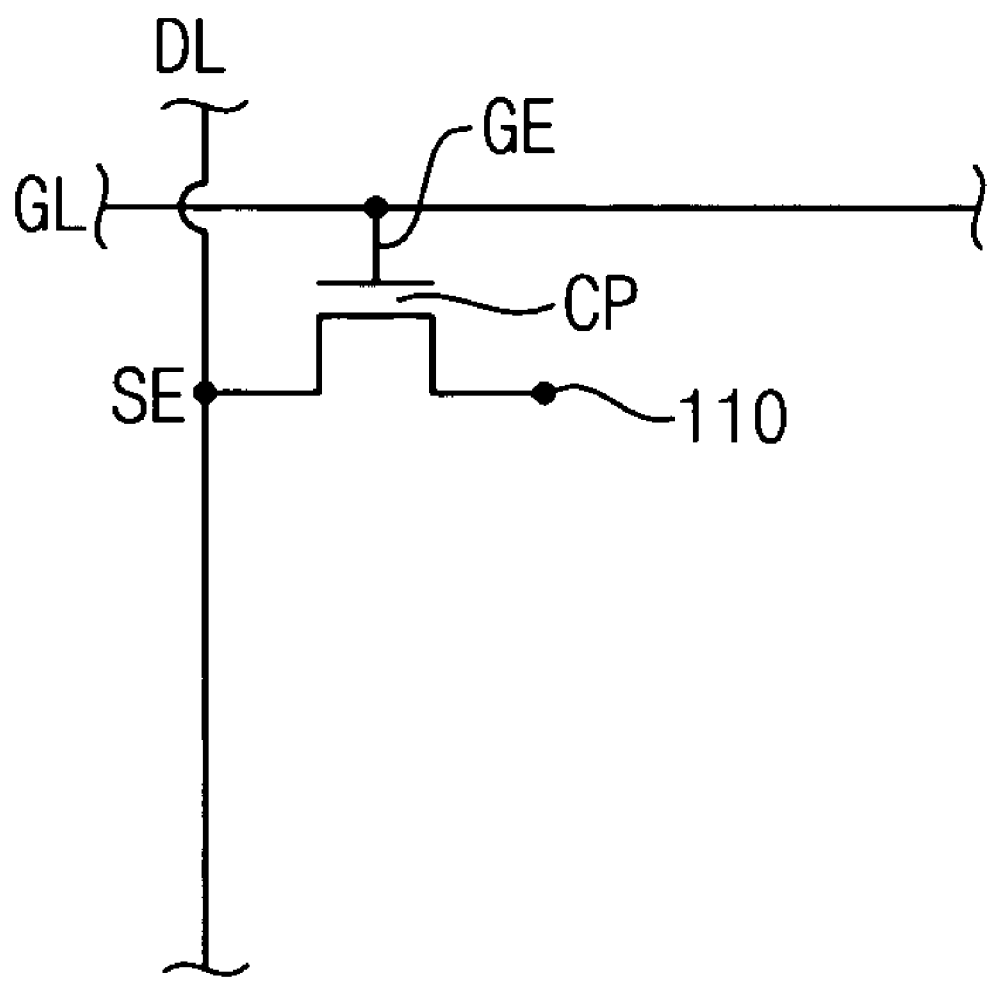
FIG. 5 is an equivalent circuit diagram illustrating the transistor (TFT) formed in the exemplary signal-applying module 120 illustrated in FIGS. 1, 2, 3 and 4.

FIG. 4 is a cross-sectional view of an (incomplete) display substrate, including a signal-applying module 120, for illustrating a method of manufacturing a display substrate (e.g., of FIGS. 1 & 2 or of 1 & 3) according to an exemplary embodiment of the present invention. FIG. 5 is an equivalent circuit diagram illustrating the transistor (TFT) formed in the signal-applying module 120 shown in FIGS. 1, 2, 3 and 4.

Referring to FIGS. 4 and 5, in order to manufacture a display substrate, firstly, a signal-applying module 120 is formed on a substrate 105.

In order to form the signal-applying module 120, a gate metal (not shown) is formed on the substrate 105 (e.g., through a chemical vapor deposition (CVD) process or a sputtering process). The gate metal is patterned (e.g., by a photolithography process) to form a gate line GL (and a gate electrode GE protruding from the gate line GL) on the substrate 105.

Then, a gate insulation layer GIL is formed on the substrate 105 (e.g., through a CVD process). The gate insulation layer GIL may include a transparent silicon nitride layer.

An n+amorphous silicon layer (not shown), an amorphous silicon layer (not shown) and a source/drain layer (not shown) are successively formed on the gate insulation layer GIL.

The source/drain layer is patterned (e.g., through a photolithography process) to form a data line DL having a source electrode SE and an output terminal 110 spaced apart from the source electrode SE on the n+amorphous silicon layer.

The n+amorphous silicon layer and the amorphous silicon layer are patterned using a mask of the data line DL and the output terminal 110 to form an n+amorphous silicon pattern nASP and an amorphous silicon pattern ASP on the gate insulation layer GIL.

Figure 6:
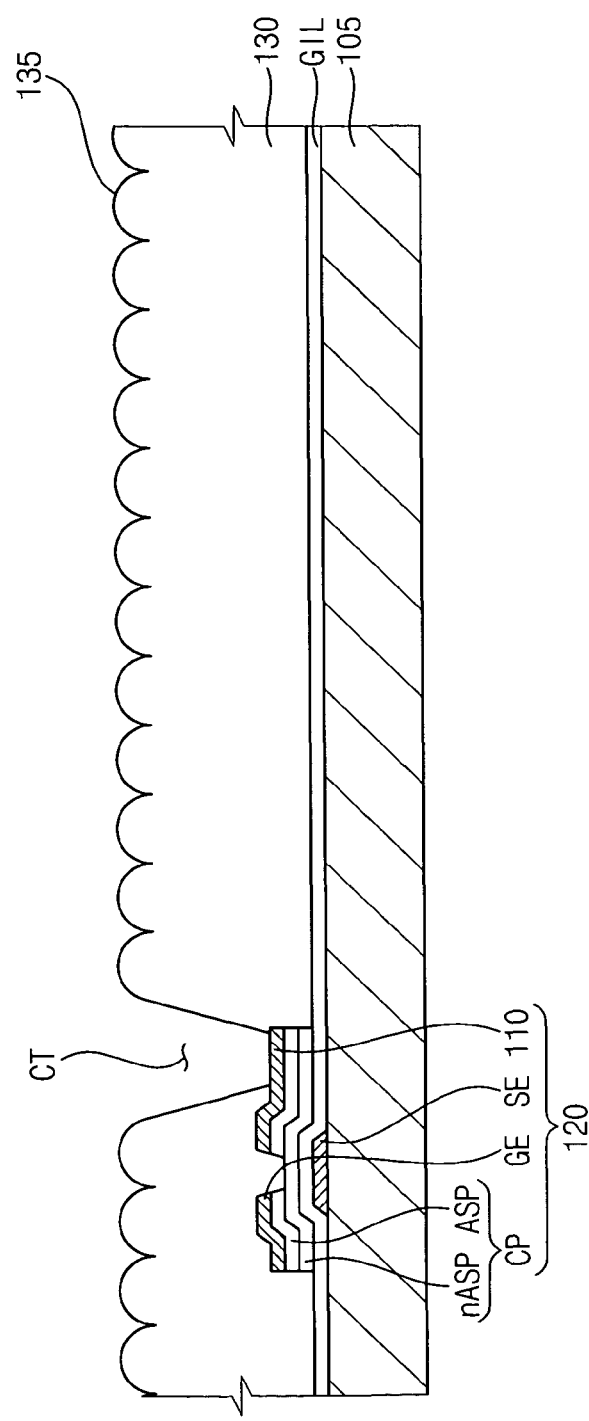
FIG. 6 is a cross-sectional view illustrating a patterned insulation layer formed on the substrate 105 in FIG. 4.

FIG. 6 is a cross-sectional view illustrating a patterned insulation layer 135 formed on the substrate 105 in FIG. 4.

Referring to FIG. 6, a thick insulation layer (not shown) is formed on the substrate 105. The insulation layer includes, for example, an organic layer having photosensitive material. The insulation layer formed on the substrate 105 is patterned (e.g., by light passing through a predetermined mask) to form a patterned insulation layer 130. Textured patterns 135 are formed on (in) the patterned insulation layer 130, and a contact hole CT exposing a portion of the output terminal 110 of the signal-applying module 120 is formed through the patterned insulation layer 130.

Figure 7:
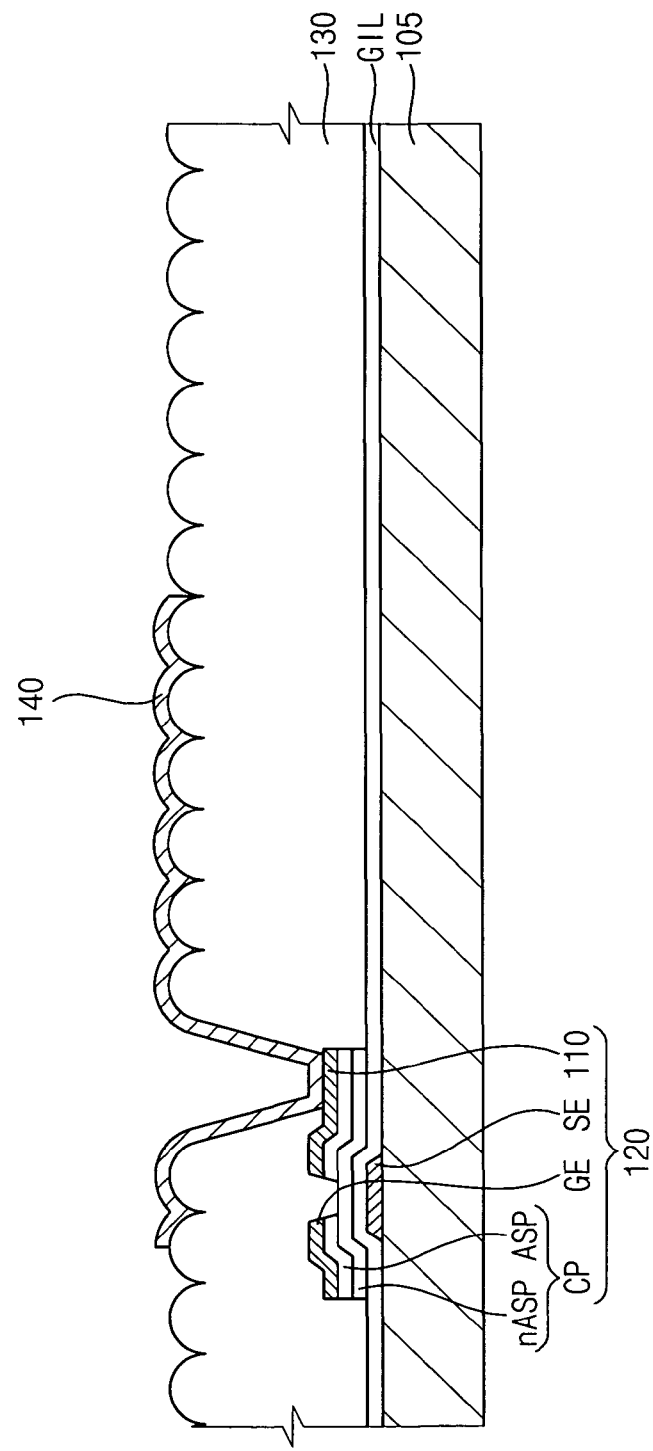
FIG. 7 is a cross-sectional view illustrating a silver-molybdenum alloy electrode formed on the patterned insulation layer illustrated in FIG. 6.

FIG. 7 is a cross-sectional view illustrating a silver-molybdenum alloy electrode formed on the patterned insulation layer 130patterned insulation layer shown in FIG. 6.

Referring to FIG. 7, a silver-molybdenum alloy layer (not shown) is formed on substantially the entire surface of the patterned insulation layer 130, including in the contact holes CT. Thus, a portion of the silver-molybdenum alloy layer is electrically connected to the output terminal 110 that is exposed by the contact hole CT formed through the patterned insulation layer 130. The silver-molybdenum alloy is formed, for example, through a CVD process or a sputtering process. The silver-molybdenum alloy layer may preferably have about 99 percent by weight to about 95 percent by weight of silver (Ag) and about 1 percent by weight to about 5 percent by weight of molybdenum (Mo).

The silver-molybdenum alloy layer may be patterned by a photolithography process to form a silver-molybdenum alloy electrode 140 on the patterned insulation layer 130. A portion of the silver-molybdenum alloy electrode 140 formed by patterning the silver-molybdenum alloy layer is electrically connected to the output terminal 110.

Hereinafter, various characteristics of the silver-molybdenum alloy layer according to an exemplary embodiment of the present invention will be described in detail.

Optical reflectivities of the silver-molybdenum alloy electrode and a pure aluminum electrode were measured.

In order to measure optical reflectivities of the silver-molybdenum alloy electrode and the pure aluminum electrode, textured patterns were formed on an organic layer, and then the silver-molybdenum alloy electrode and the pure aluminum electrode were formed on the textured patterns.

Table 1 below shows measurements of optical reflectivities, color coordinates and adhesivities of the silver-molybdenum alloy electrode and the pure aluminum electrode. Table 1 indicates optical reflectivity of light that was reflected from each of the silver-molybdenum alloy electrode and the pure aluminum electrode, formed on the textured patterns.

TABLE 1

|  | Optical Reflectivity | Color Coordinates | Adhesion |
|---|---|---|---|
| Silver-molybdenum Alloy Electrode | 73.0% | X = 0.1364<br>Y = 0.3359 | Excellent |
| Pure Aluminum Electrode | 60.4% | X = 0.3129<br>Y = 0.3307 | Excellent |

Referring to Table 1, the silver-molybdenum alloy electrode had a reflectivity 20% greater than that of the pure aluminum electrode, while an adhesivity of the silver-molybdenum alloy electrode to the organic layer was substantially the same as an adhesivity of the pure aluminum electrode to the organic layer.

Figure 8:
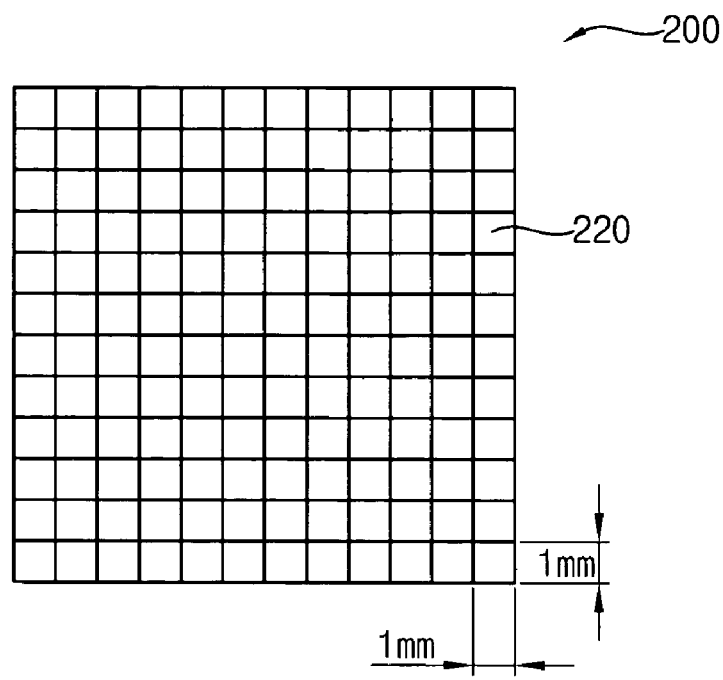
FIG. 8 is a plan view of a test plate for adhesion testing a silver-molybdenum alloy layer according to an exemplary embodiment of the present invention.
Figure 9:
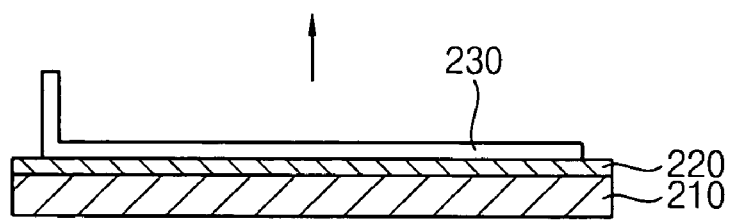
FIG. 9 is a cross-sectional view of a portion of the test plate of FIG. 8 under test, for illustrating a method of performing the adhesion test in FIG. 8.

FIG. 8 is a plan view of a test plate for adhesion testing a silver-molybdenum alloy layer formed according to an exemplary embodiment of the present invention. FIG. 9 is a cross-sectional view of a portion of the test plate of FIG. 8 under test, for illustrating a method of performing the adhesion test in FIG. 8.

Referring to FIGS. 8 and 9, a test plate 200 includes a base film 210 (FIG. 9) and a test film 220 (FIG. 9) formed on the base film 210.

The base film 210 includes, for example, glass, silicon oxide, indium tin oxide, polycarbonate, polyethylene terephthalate, acryl resin, polyimide, etc.

The test film 220 may include the silver-molybdenum alloy layer or a pure silver layer.

The test film 220 for an adhesion test is cut into about 1 mm×1 mm pieces using a cutter. After the test film 220 is formed into a lattice shape, an adhesive tape 230 is adhered to the test film 220, and then is peeled off the test film 220.

Table 2 below shows results from an adhesion test. In Table 2, symbols "○", "Δ"and "X" respectively indicate "no exfoliation", "exfoliation less than about 50%" and "exfoliation more than about 50%" (of the test film off of the base film).

TABLE 2

|  | Pure Silver | Silver-molybdenum Alloy | |
|---|---|---|---|
|  | Deposition | Deposition | After Annealing |
| Glass | X | ○ | ○ 250° C. |
| Silicon Oxide | X | ○ | ○ 250° C. |
| Indium Tin Oxide | Δ | ○ | ○ 250° C. |
| Polycarbonate | X | ○ | Not tested |
| PET | Δ | ○ | Not tested |
| Acryl Resin | X | ○ | ○ 150° C. |
| Polyimide | — | ○ | ○ 150° C. |

Referring to Table 2, although the pure silver layer that served as the test film caused exfoliation irrespective of the base film, the silver-molybdenum alloy layer that served as the test film caused no exfoliation irrespective of the base film. Therefore, adhesion of the silver-molybdenum alloy layer to the base film was much greater than that of the pure silver layer to the base film.

Figure 10:
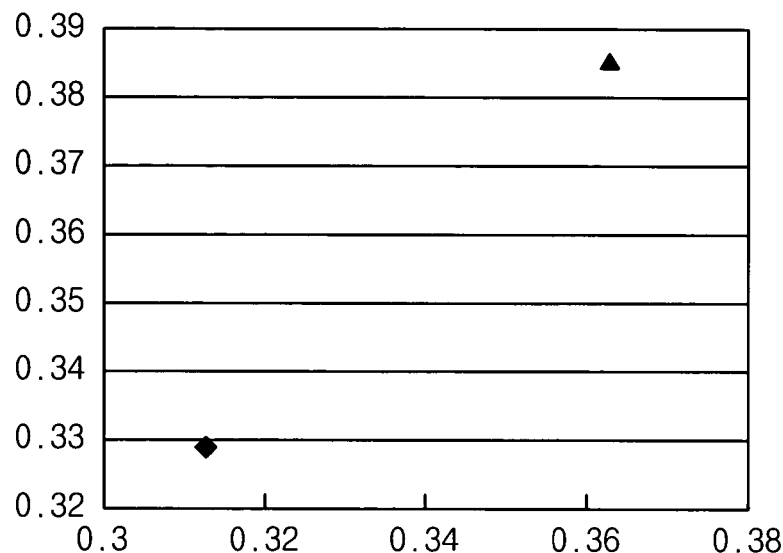
FIG. 10 is a graph showing color coordinates of a silver-molybdenum alloy layer before (diamond) annealing and after (triangle) annealing according to an exemplary embodiment of the present invention.

FIG. 10 is a graph showing color coordinates of a silver-molybdenum alloy layer before and after annealing according to an exemplary embodiment of the present invention. In FIG. 10, symbols "♦" (diamond) and "▲" (triangle) indicate color coordinates before baking and after baking, respectively.

Referring to FIG. 10, after the pure silver was baked, color coordinates of the pure silver were greatly changed. The pure silver became yellowish through baking. In contrast, after the silver-molybdenum alloy was baked, color coordinates of the silver-molybdenum alloy were almost unchanged, and thus an image color of a display device employing the silver-molybdenum alloy was also almost unchanged.

Figure 11:
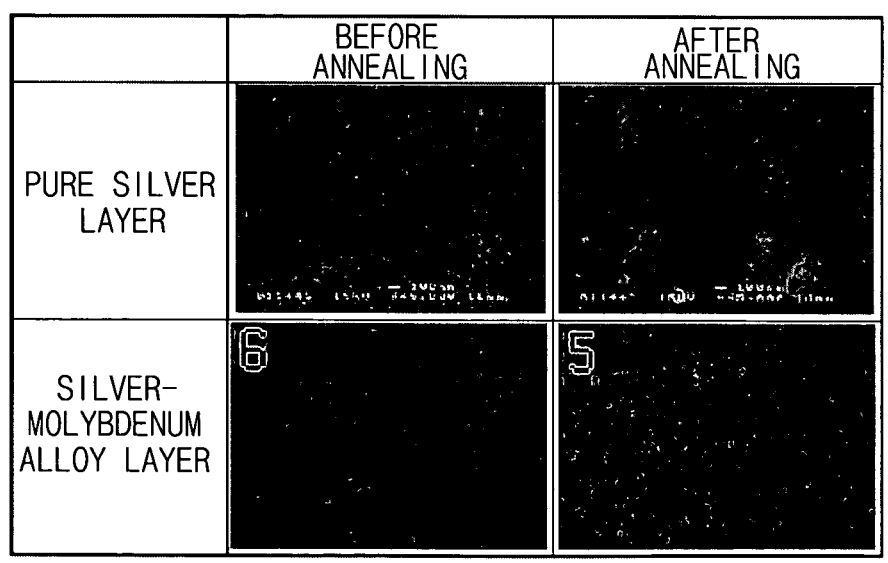
FIG. 11 shows four scanning electron microscope (SEM) pictures showing a pure silver layer and a silver-molybdenum alloy layer before and after annealing, according to an exemplary embodiment of the present invention.
Figure 12A:
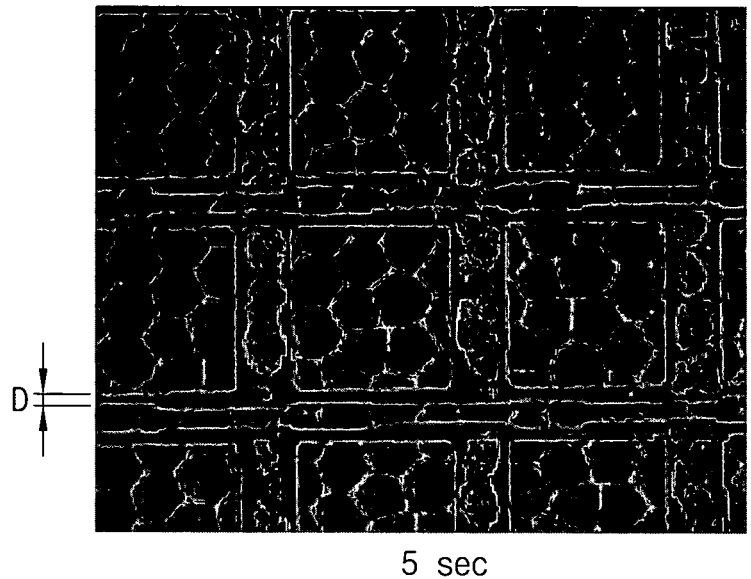
FIGS. 12A, 12B, 12C and 12D are SEM pictures showing etching characteristics of a silver-molybdenum alloy layer.
Figure 12B:
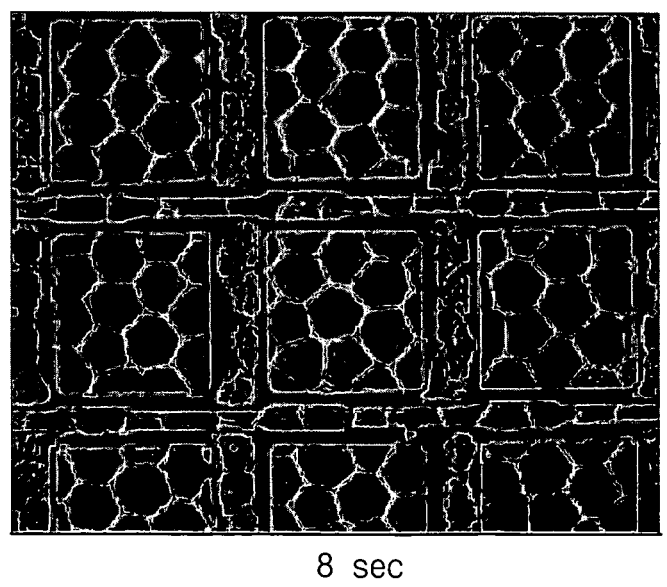
Figure 12C:
Figure 12D:
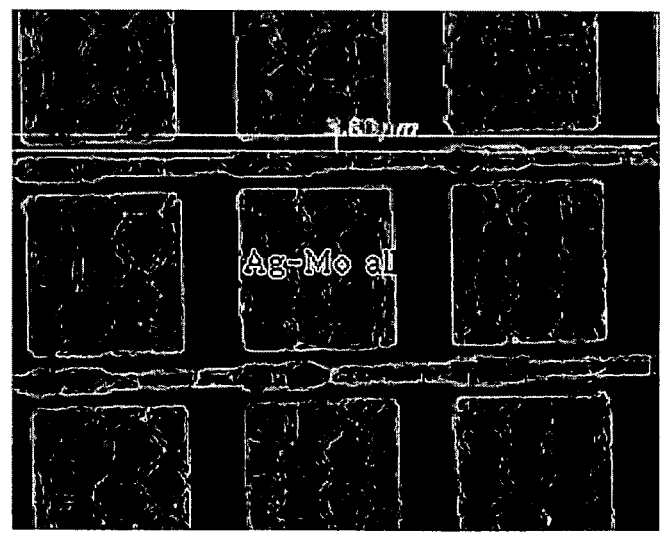

FIG. 11 shows four scanning electron microscope (SEM) pictures of a pure silver layer and a silver-molybdenum alloy layer before and after annealing, according to an exemplary embodiment of the present invention.

Referring to FIG. 11, after annealing the pure silver layer, hillocks were formed on the pure silver layer, making it uneven. When the pure silver layer has hillocks, externally provided light is irregularly scattered by the uneven surface of the pure silver layer, thereby greatly reducing its optical reflectivity. In contrast, after annealing the silver-molybdenum layer, the silver-molybdenum layer was still relatively even (smooth).

FIGS. 12A, 12B, 12C and 12D are SEM pictures showing etching characteristics of a silver-molybdenum alloy layer.

Referring to FIGS. 12A to 12D, when the silver-molybdenum alloy layer is etched using a conventional etchant (used for etching pure silver), the silver-molybdenum alloy layer was patterned to have a substantially uniform interval D of about 4 μm, and the optimum etching time was found to be about seventeen seconds. Thus, the silver-molybdenum alloy layer according to the present invention has good etching characteristics with respect to the conventional etchant.

Figure 13:
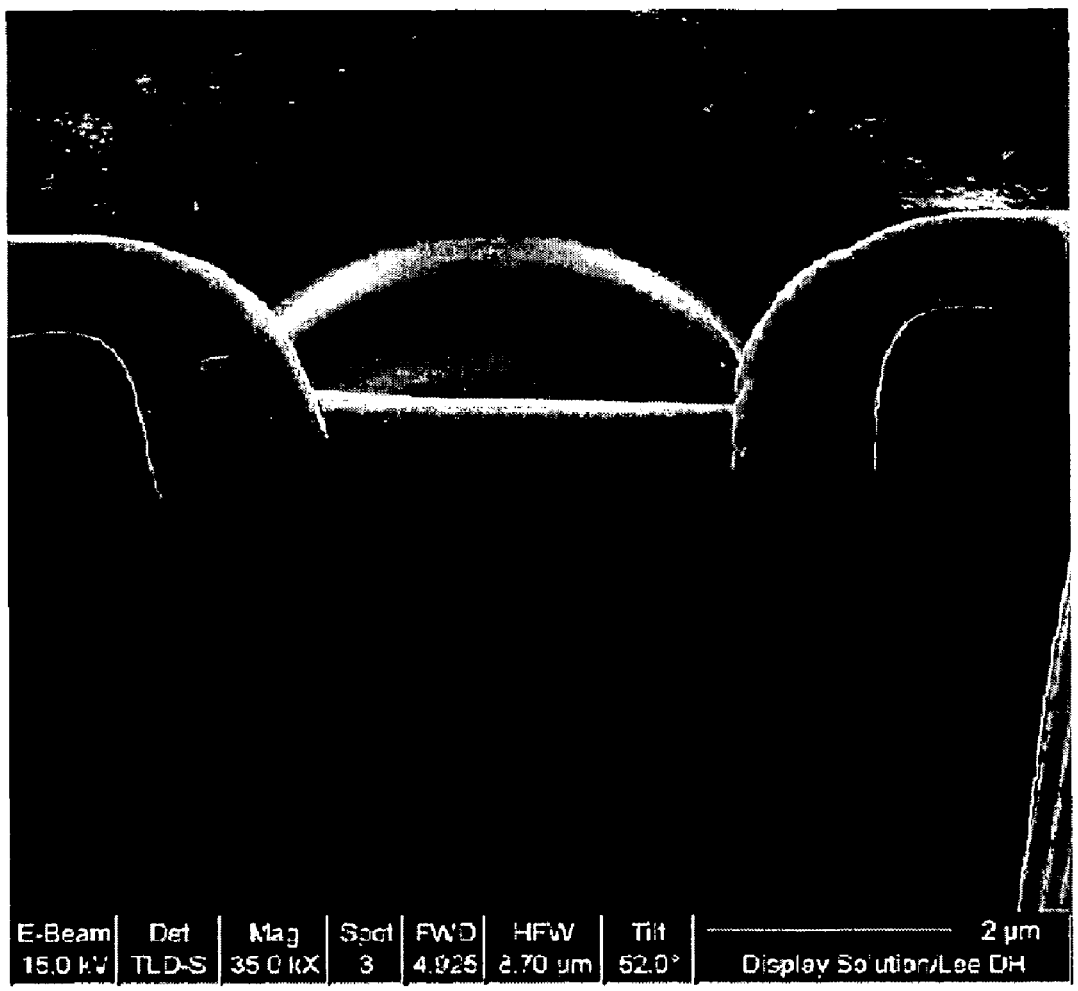
FIG. 13 is an SEM picture illustrating a step coverage of the silver-molybdenum alloy layer.

FIG. 13 is an SEM picture illustrating a step coverage of the silver-molybdenum alloy layer.

Referring to FIG. 13, in order to observe a profile of the silver-molybdenum alloy layer positioned within a via hole (contact hole), the via hole having a thickness of about 5 μm was formed through an insulation layer. Then, an indium tin oxide layer and a silver-molybdenum alloy layer were successively deposited on the insulation layer having the via hole at thicknesses of about 70 nm and about 240 nm, respectively. The silver-molybdenum alloy layer had a good step coverage as shown in FIG. 13.

Figure 14:
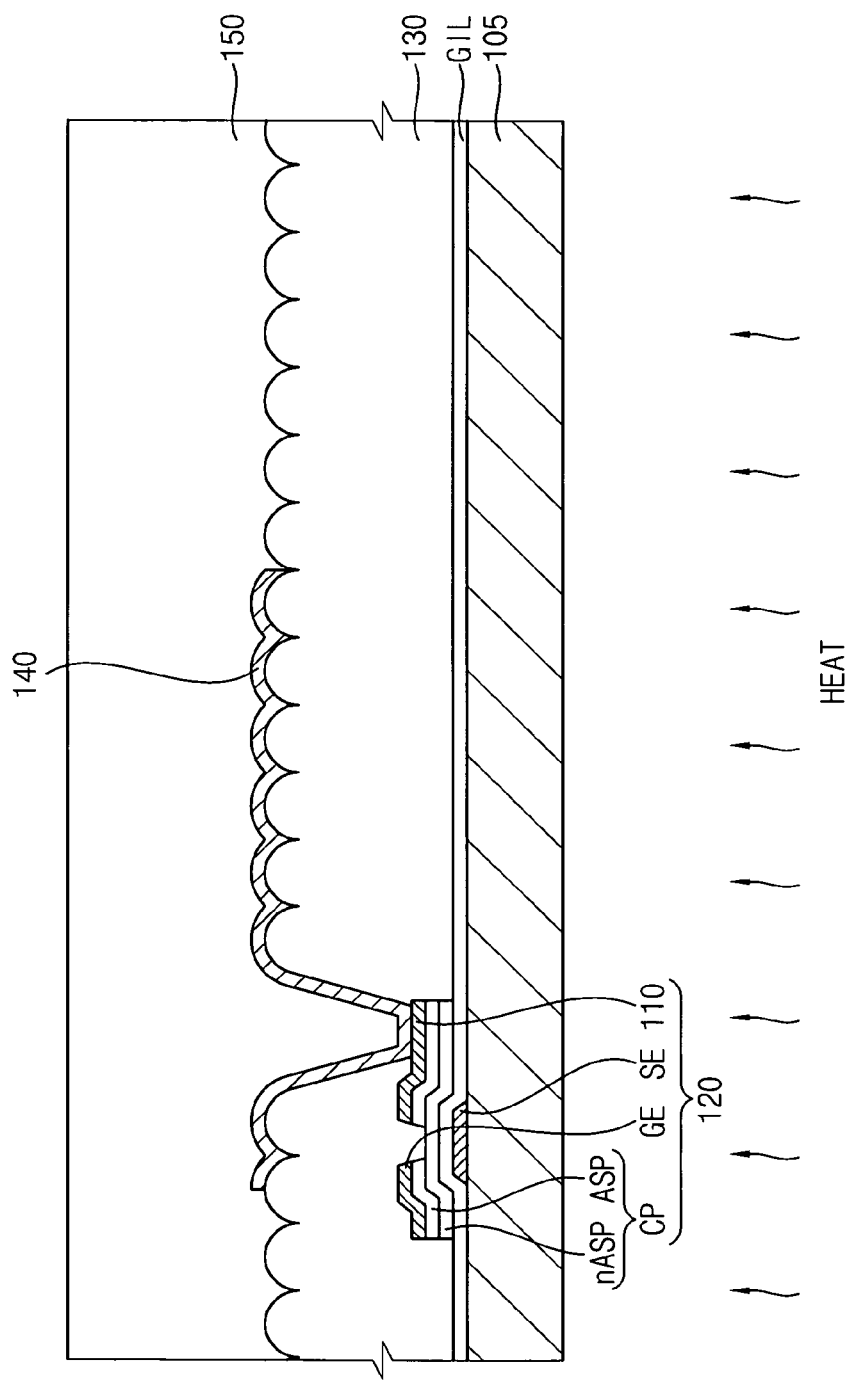
FIG. 14 is a cross-sectional view of a first substrate illustrating an alignment layer formed on a patterned insulation layer according to an exemplary embodiment of the present invention.

FIG. 14 is a cross-sectional view of a first substrate illustrating an alignment layer 150 formed on a patterned insulation layer 130 according to an exemplary embodiment of the present invention.

Referring to FIG. 14, an alignment layer 150 is formed on the patterned insulation layer 130. For example, the alignment layer 150 includes polyimide resin. The alignment layer 150 may be baked at a temperature of about 150° C. to about 250° C. to prevent yellowing of the silver-molybdenum alloy layer and prevent formation of hillocks on the silver-molybdenum alloy layer.

Figure 15:
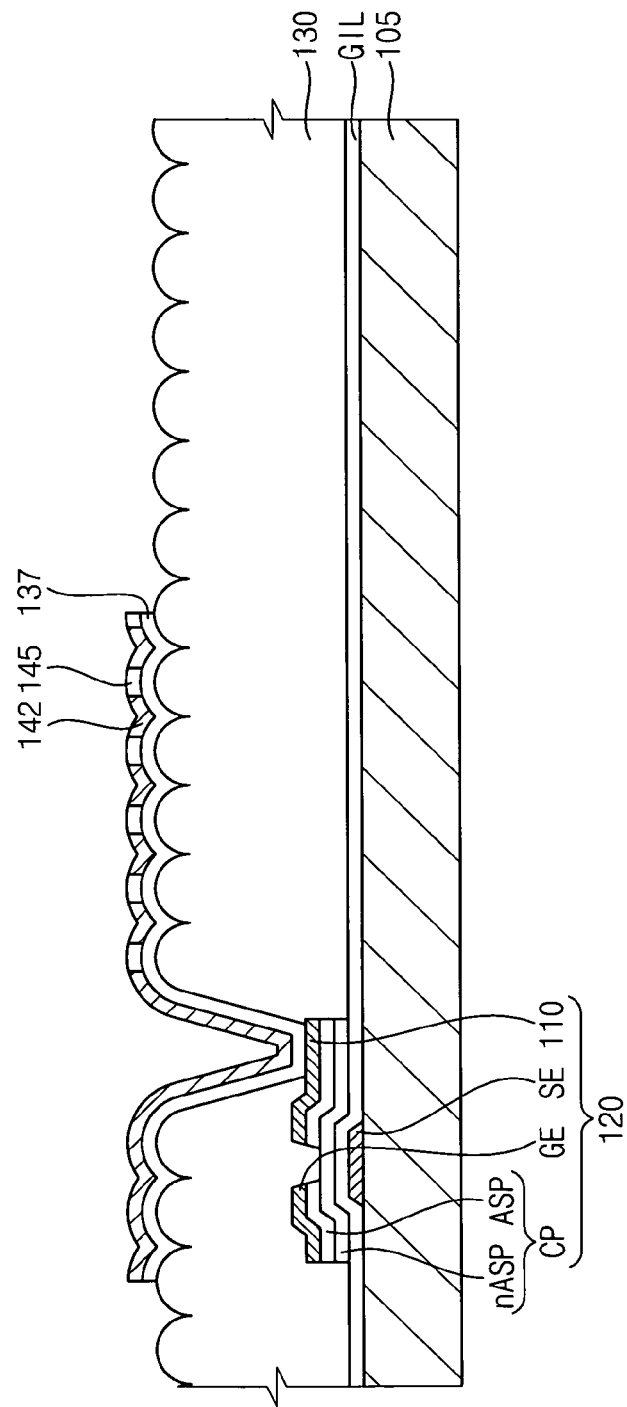
FIG. 15 is a cross-sectional view of a first substrate illustrating a method of manufacturing a display substrate according to another exemplary embodiment of the present invention.

FIG. 15 is a cross-sectional view of a first substrate illustrating a method of manufacturing a display substrate according to another exemplary embodiment of the present invention. The method of manufacturing a display substrate in FIG. 15 is substantially the same as the method of manufacturing a display substrate illustrated in FIGS. 4 and 14, except for a transparent electrode and an opening of in the silver-molybdenum alloy electrode. Thus, substantially the same elements will be represented by the same reference numerals and the same names.

Referring to FIG. 15, a transparent conductive layer (e.g., 137) is formed on substantially the entire surface of the patterned insulation layer 130, and a silver-molybdenum alloy layer (e.g., 142) is formed on the transparent conductive layer. Although the silver-molybdenum alloy layer is formed on the transparent conductive layer in FIG. 15, alternatively, the transparent conductive layer may be formed on the silver-molybdenum alloy layer.

The transparent conductive layer and the silver-molybdenum alloy layer, which are formed on the patterned insulation layer 130, are patterned (e.g., through a photolithography process) to form a transparent electrode 137 and a silver-molybdenum alloy electrode 142 on the patterned insulation layer 130. The transparent electrode 137 and the silver-molybdenum alloy electrode 142 are electrically connected to the output terminal 110 (of the TFT). The silver-molybdenum alloy electrode 142 may have a plurality of openings 145. The openings 145, for example, have a polygon shape when viewed from a plan view.

Display Device

Figure 16:
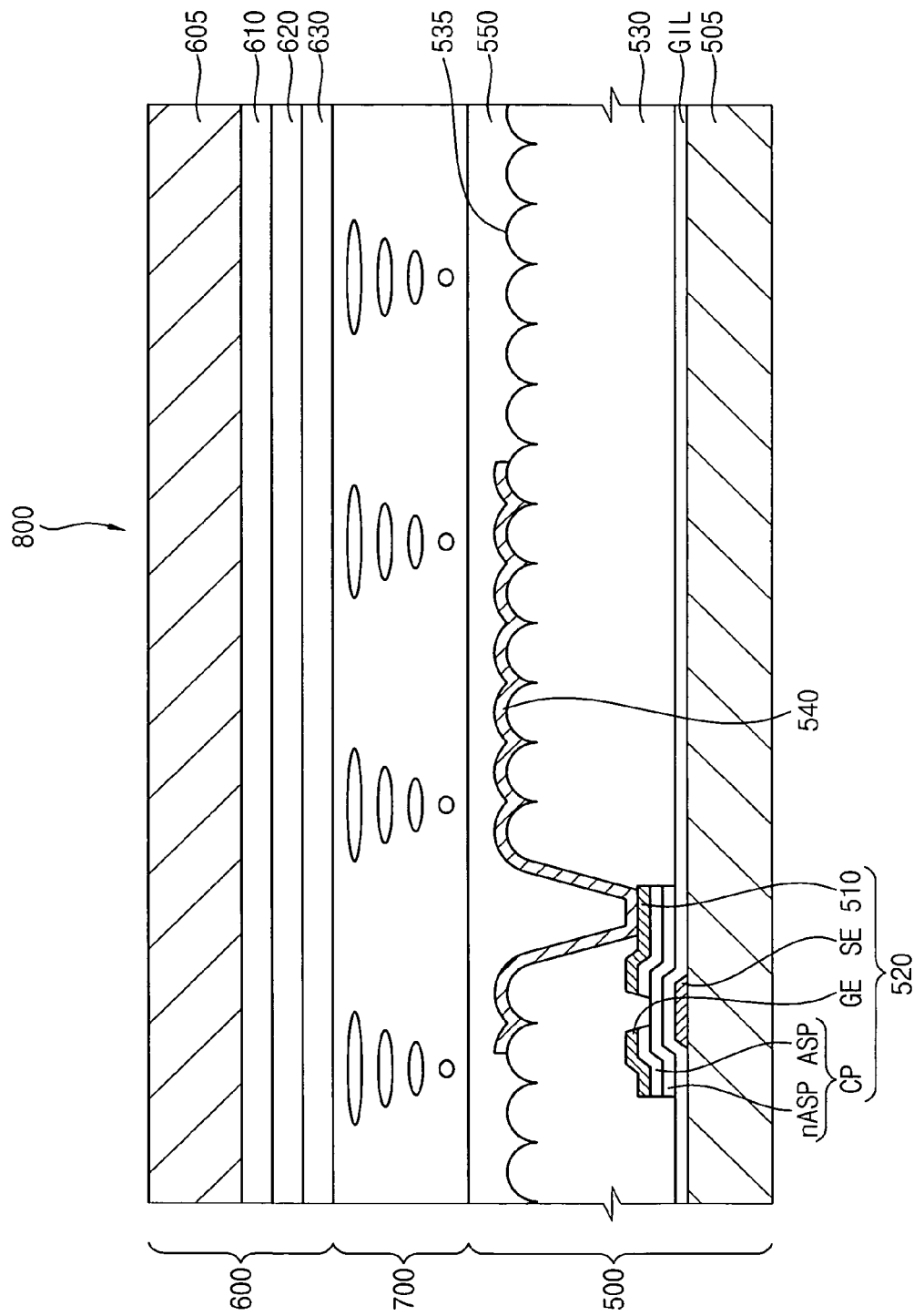
FIG. 16 is a cross-sectional view of an assembled display device (comprising first display substrate, second display substrate, and a liquid crystal layer) according to an exemplary embodiment of the present invention.

FIG. 16 is a cross-sectional view illustrating an assembled display device (comprising first display substrate, second display substrate, and a liquid crystal layer) according to an exemplary embodiment of the present invention.

Referring to FIG. 16, a display device 800 includes a first display substrate 500, a second display substrate 600 and a liquid crystal layer 700.

The first display substrate 500 includes a first substrate 505, a signal-applying module 520 having an output terminal 510, a patterned insulation layer 530 and a silver-molybdenum alloy electrode 540.

The first substrate 505 includes a transparent substrate such as a glass substrate capable of passing light.

The signal-applying module 520 (of each pixel) is disposed on the first substrate 505. The signal-applying module 520 (of each pixel) outputs image data externally provided while the display is in use.

Particularly, the signal-applying module 520 includes a gate line (not shown) having a gate electrode GE, a gate insulation layer GIL, a channel pattern CP, a data line (not shown) having a source electrode SE and the output (drain) terminal 510.

The gate line extends, for example, in a first (e.g., horizontal) direction. When the first display substrate 500 has a resolution of 1024×768, a plurality of 768 gate lines are substantially parallelly distributed in a second direction that is substantially perpendicular to the first direction. A plurality of 1024×3 gate electrodes GE protrudes from each gate line on the first substrate 505.

The gate insulation layer GIL covers the gate line having the gate electrode GE to insulate the gate line from the data lines having the source electrode SE. The gate insulation layer GIL may include a transparent silicon nitride layer.

The channel pattern CP (semiconductor island) is formed on the gate insulation layer GIL. The channel pattern CP, for example, is disposed on the gate insulation layer GIL corresponding to the gate electrode GE. The channel pattern CP includes an amorphous silicon pattern ASP and an n+amorphous silicon pattern nASP. A pair of n+amorphous silicon patterns nASP are disposed on the amorphous silicon pattern ASP, and spaced apart from each other.

The data lines are disposed on the gate insulation layer GIL. Each of the data lines extends in the second (vertical) direction that is substantially perpendicular to the first direction. When the first display substrate 500 has a resolution of 1024×768: there a plurality of 1024×3 data lines distributed in the first direction; a plurality of 768 source electrodes SE h protrudes from each data line on the first substrate 505.

Each source electrode SE is electrically connected to one of the n+amorphous silicon patterns nASP. The output terminal 510 is electrically connected to the other of the n+amorphous silicon patterns nASP. The output terminal 510 is formed simultaneously with the data line.

The patterned insulation layer 530 is disposed on the first substrate 505, so that the signal-applying module 520 is covered with the patterned insulation layer 530. The patterned insulation layer 530 includes a contact hole exposing the output terminal 510 of the signal-applying module 520. The patterned insulation layer 530 includes, for example, a photosensitive material that is sensitized to light so as to facilitate formation of the contact hole.

A plurality of textured (e.g., embossed) patterns 535 is formed on the patterned insulation layer 530. The textured patterns 535 increase a reflective area of a silver-molybdenum alloy electrode 540 that will be described later, and diffuses light reflected from the silver-molybdenum alloy electrode 540.

The silver-molybdenum alloy electrode 540 is formed on the textured patterns 535 on the patterned insulation layer 530. A portion of the silver-molybdenum alloy electrode 540 is electrically connected to the output terminal 510 exposed by the contact hole.

The silver-molybdenum alloy electrode 540 may preferably have about 99 percent by weight to about 95 percent by weight of silver (Ag) and about 1 percent by weight to about 5 percent by weight of molybdenum (Mo).

An alignment layer 550 is formed on the silver-molybdenum alloy electrode 540. The alignment layer 550 includes, for example, polyimide resin. Alignment grooves are formed on the alignment layer 550 to align liquid crystal molecules of the liquid crystal layer 700.

The alignment layer 550 including polyimide resin is cured at a temperature of about 150° C. to about 250° C.

Hillocks may not be formed on the silver-molybdenum alloy electrode 540 when the alignment layer 550 is cured at the above temperature of about 150° C. to about 250° C., thereby preventing exfoliation of the silver-molybdenum alloy electrode 540 from the patterned insulation layer 530.

The second display substrate 600 includes a second substrate 605, a color filter 610, (for example, formed on the second substrate 605), a common electrode 620 formed on the color filter 610 and a second alignment layer 630.

In FIG. 16, the color filter 610 is positioned to correspond to the silver-molybdenum alloy electrode 540 of the first display substrate 500. The color filter 610 includes, for example, a red color filter for passing red light of white light, a green color filter for passing green light of white light, and a blue color filter for passing blue light of white light.

The common electrode 620 is formed on the color filter 610. The common electrode 620 may include a transparent conductive material such as indium tin oxide, indium zinc oxide, amorphous indium tin oxide, etc. The common electrode 620 faces the silver-molybdenum alloy electrode 540 of the first display substrate 500.

The second alignment layer 630 is positioned to face the first alignment layer 550. Alignment grooves are formed on the second alignment layer 630 to align liquid crystal molecules of the liquid crystal layer 700.

The liquid crystal layer 700 is disposed between the first display substrate 500 and the second display substrate 600.

According to embodiments of the present invention, an electrode of a display device includes silver-molybdenum alloy, thereby improving display quality of an image displayed by the display device.

Although exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display device comprising:
   a first substrate; and
   a second substrate combined with the first substrate to face the first substrate, the second substrate comprising:

a signal-applying module disposed on a substrate and having an output terminal configured to output a data signal;

a patterned insulation layer having a contact hole that exposes the output terminal;

a single layer silver-molybdenum alloy electrode as a reflective electrode, comprising silver and molybdenum, that both reflects light and receives the data signal through the output terminal to change arrangement of liquid crystal molecules interposed between the first and second substrates; and a transparent and conductive electrode formed between the patterned insulation layer and the single layer silver-molybdenum alloy electrode, wherein the single layer silver-molybdenum alloy electrode avoids hillocks and galvanic corrosion between the reflective electrode and the transparent and conductive electrode.

2. The display device of claim 1, wherein the signal-applying module further comprises:

a transistor-gate electrode protruding from a gate line that receives a timing signal;

a gate insulation layer configured to insulate the transistor-gate electrode;

a transistor channel in a semiconductor layer disposed on the gate insulation layer over the gate electrode; and a transistor-source electrode protruding from a data line to input the data signal to the transistor channel, wherein the output terminal is a transistor-drain terminal.

3. The display device of claim 1, wherein a textured pattern is formed on the patterned insulation layer.

4. The display device of claim 3, wherein the textured pattern is an embossed pattern.

5. The display device of claim 1, wherein the single layer silver-molybdenum alloy electrode has about 99 percent by weight to about 95 percent by weight of silver (Ag) and about 1 percent by weight to about 5 percent by weight of molybdenum (Mo).

6. The display device of claim 1, wherein the single layer silver-molybdenum alloy electrode has a plurality of openings having a polygon shape.

7. The display device of claim 1, wherein the transparent and conductive electrode includes at least one of indium tin oxide and indium zinc oxide.

8. A method of manufacturing a display device, comprising:

forming a first substrate; and forming a second substrate combined with the first substrate to face the first substrate, forming, forming the second substrate comprising:

forming a signal-applying module on a substrate, the signal-applying module comprising an output terminal configured to output a data signal;

forming a patterned insulation layer covering the signal-applying module except for a contact hole that exposes a portion of the output terminal;

forming a transparent and conductive electrode on the patterned insulation layer;

forming a single layer silver-molybdenum alloy layer on the transparent and conductive electrode to be electrically connected, through the contact hole, to the output terminal; and patterning the single layer silver-molybdenum alloy layer to form a single layer silver-molybdenum alloy electrode as a reflective electrode that both reflects light and receives the data signal through the output terminal to change arrangement of liquid crystal molecules between the first and second substrates, wherein the single layer silver-molybdenum alloy electrode avoids hillocks and galvanic corrosion between the reflective electrode and the transparent and conductive electrode.

9. The method of claim 8, wherein the single layer silver-molybdenum alloy layer has about 99 percent by weight to about 95 percent by weight of silver (Ag) and about 1 percent by weight to about 5 percent by weight of molybdenum (Mo).

10. The method of claim 8, wherein forming the patterned insulation layer further comprises embossing a pattern on the insulation layer.

11. The method of claim 8, wherein the single layer silver-molybdenum alloy electrode has a plurality of openings.

12. The method of claim 8, further comprising, after forming the single layer silver-molybdenum alloy electrode:

forming an alignment layer on the patterned insulation layer so as to cover the single layer silver-molybdenum alloy electrode; and baking the alignment layer at a temperature of about 150° C. to about 250° C.

13. The method of claim 8, further comprising, after forming the single layer silver-molybdenum alloy electrode:

forming an alignment layer on the patterned insulation layer so as to cover the single layer silver-molybdenum alloy electrode; and baking the alignment layer at a temperature selected so as to prevent the single layer silver-molybdenum alloy electrode from yellowing.

\* \* \* \* \*